(12) United States Patent
Braskich et al.

(10) Patent No.: US 7,707,415 B2
(45) Date of Patent: Apr. 27, 2010

(54) TUNNELING SECURITY ASSOCIATION MESSAGES THROUGH A MESH NETWORK

(75) Inventors: Anthony J. Braskich, Palatine, IL (US); Stephen P. Emeott, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 233 days.

(21) Appl. No.: 11/470,973

(22) Filed: Sep. 7, 2006

(65) Prior Publication Data

US 2008/0063205 A1 Mar. 13, 2008

(51) Int. Cl.
*H04L 9/32* (2006.01)
*H04L 9/00* (2006.01)

(52) U.S. Cl. ............... 713/168; 713/153; 380/270; 726/4

(58) Field of Classification Search ............ 713/168
See application file for complete search history.

(56) References Cited

U.S. PATENT DOCUMENTS

| | | | |
|---|---|---|---|
| 5,572,528 A | 11/1996 | Shuen | |
| 6,983,167 B2 | 1/2006 | Adachi et al. | |
| 6,996,714 B1 * | 2/2006 | Halasz et al. | 713/163 |
| 7,016,948 B1 | 3/2006 | Yildiz | |
| 7,039,068 B1 | 5/2006 | Halasz | |
| 7,107,620 B2 * | 9/2006 | Haverinen et al. | 726/29 |
| 7,171,555 B1 * | 1/2007 | Salowey et al. | 713/156 |
| 7,194,763 B2 * | 3/2007 | Potter et al. | 726/7 |
| 7,197,643 B2 | 3/2007 | Takase | |
| 7,231,530 B1 | 6/2007 | Miller et al. | |
| 7,418,596 B1 * | 8/2008 | Carroll et al. | 713/169 |
| 7,448,068 B2 * | 11/2008 | Sun et al. | 726/2 |
| 7,502,331 B2 * | 3/2009 | Dommety et al. | 370/254 |
| 7,508,803 B2 | 3/2009 | Emeott et al. | |
| 7,529,933 B2 * | 5/2009 | Palekar et al. | 713/168 |
| 7,275,157 B2 | 9/2009 | Cam-Winget | |
| 2002/0012433 A1 * | 1/2002 | Haverinen et al. | 380/247 |
| 2002/0184055 A1 * | 12/2002 | Naghavi et al. | 705/2 |
| 2002/0184487 A1 | 12/2002 | Badamo et al. | |
| 2003/0226017 A1 * | 12/2003 | Palekar et al. | 713/168 |
| 2003/0236982 A1 * | 12/2003 | Hsu | 713/171 |
| 2004/0093522 A1 * | 5/2004 | Bruestle et al. | 713/201 |
| 2004/0103282 A1 | 5/2004 | Meier et al. | |
| 2004/0240412 A1 | 12/2004 | Winget | |
| 2004/0258092 A1 | 12/2004 | Sugaya | |
| 2005/0041662 A1 | 2/2005 | Kuo et al. | |
| 2005/0223111 A1 | 10/2005 | Bhandaru et al. | |
| 2005/0249244 A1 | 11/2005 | McNamara et al. | |
| 2006/0002351 A1 | 1/2006 | Madour | |
| 2006/0062391 A1 | 3/2006 | Lee et al. | |
| 2006/0111045 A1 | 5/2006 | Orlassino et al. | |
| 2006/0198368 A1 | 9/2006 | Guichard et al. | |

(Continued)

OTHER PUBLICATIONS

Funk, Paul et al. EAP Tunneled TLS Authentication Protocol (EAP-TTLS). Jul. 2004. p. 1-54.*

(Continued)

*Primary Examiner*—Christian LaForgia
(74) *Attorney, Agent, or Firm*—Randi L. Karpinia

(57) ABSTRACT

The disclosure relates to techniques and technologies for establishing a secure link between a mesh authenticator and a mesh key distributor for transporting security association messages. The secure link can allow the mesh key distributor to communicate results of an authentication process to the mesh authenticator.

17 Claims, 7 Drawing Sheets

U.S. PATENT DOCUMENTS

| | | | |
|---|---|---|---|
| 2007/0192605 A1* | 8/2007 | Mizikovsky et al. | 713/170 |
| 2007/0206537 A1* | 9/2007 | Cam-Winget et al. | 370/331 |
| 2007/0250713 A1* | 10/2007 | Rahman et al. | 713/171 |
| 2007/0264965 A1* | 11/2007 | Taniguchi | 455/403 |
| 2008/0063205 A1 | 3/2008 | Braskich et al. | |

OTHER PUBLICATIONS

IEEE Standard for Information Technology—Telecommunications and information exchange between systems—Local and metropolitan area networks—Specific requrienments: Part 11: Wireless LAN Medium Access Control (MAC) and Physical Layer (PHY) specifications Amendment 6: Medium Access Control (MAC) Security Enhancements. Jun. 24, 2004. IEEE. p. 1-190.*

Aboba, B. et al. RFC: 3748 Extensible Authentication Protocol (EAP). Jun. 2004. IEEE. p. 1-63.*

PCT/US07/75439 - PCT Search Report and Written Opinion-Mailed Jul. 7, 2008 - 9 pages.

IEEE 802.11r/D2.2, 8A.2.1 - Part 11 - Amendment 2: Fast BSS Transition - Fast BSS Transition Initial Mobility Domain Association in an RSN - Jul. 2006 - pp. 39-42.

IEEE P802.11r/D2.2, "Key Distribution for Fast BSS Transition," Part 11 - Amendment 2: Fast BSS Transition - Section 8.5A - Jul. 2006 - pp. 24-30.

PCT/US07/76592 - PCT Search Report and Written Opinion - Mailed Jun. 4, 2008 - 9 pages.

IEEE P802.11s/D1.0, "Action Frame Format Details, " Part 11 - Amendment 2: ESS Mesh Networking - Section 7.4 - Nov. 2006 - pp. 53-64.

U.S. Patent Office - Appl. No. 11/470,921 - Office Action mailed May 15, 2008 - 10 pages.

U.S. Patent Office - Appl. No. 11/470,921 - Office Action mailed Nov. 26, 2008 - 13 pages.

U.S. Patent Office - Appl. No. 11/470,921 - Office Action mailed Jun. 16, 2009 - 10 pages.

U.S. Patent Office - Appl. No. 11/470,980 - Office Action mailed Apr. 8, 2008 - 11 pages.

PCT/US07/76594 - PCT Search Report and Written Opinion - Mailed Apr. 8, 2008 - 7 pages.

U.S. Patent Office - Appl. No. 11/470,980 - Final Office Action mailed Oct. 16, 2008 - 12 pages.

PCT/US07/76594 - PCT Preliminary Examination Report on Patentability - Mailed Mar. 19, 2009 - 6 pages.

U.S. Patent Office - Appl. No. 11/470,980 - Non-final Office Action mailed Mar. 18, 2009 - 13 pages.

U.S. Patent Office - Appl. No. 11/470,980 - Final Office Action mailed Nov. 30, 2009 - 17 pages.

U.S. Patent Office - Appl. No. 11/470,969 - Office Action mailed Jun. 19, 2008 - 9 pages.

PCT/US07/75429 - PCT Search Report and Written Opinion - Mailed Sep. 9, 2008 - 11 pages.

PCT/US07/75429 - PCT Preliminary Examination Report on Patentability - Mailed Mar. 19, 2009 - 8 pages.

* cited by examiner

TUNNELING SECURITY ASSOCIATION MESSAGES THROUGH A MESH NETWORK

FIELD OF THE INVENTION

The present invention relates generally to wireless communications and more particularly to security in a multi-hop ad hoc network.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination.

As wireless communications networks become more prevalent, security continues to be a major concern to both communication network providers and end users. This is most evident when using a mobile wireless network where the security environment can offer the greatest challenges since data may be readily received and manipulated by many nodes. The radio links used in a wireless network expose the signaling and data traversing the network to eavesdroppers and/or would-be hackers. In a multi-hop wireless network, this requires each link between the nodes to have a unique security association established through the multi-hop authentication and key management process. Then, the communications on the links can be protected with the established security associations.

Mobile nodes such as cellular phones, personal digital assistants (PDAs) and notebook computers often require authentication when accessing remote databases or networks. In prior systems, a centralized authentication procedure is followed where an Access Point (AP), such as a base station, acts as a portal between the mobile wireless network and a wired backhaul network and handles an authentication process for all nodes within range of the AP. For instance, systems which adhere to American National Standards Institute/ Institute of Electrical and Electronics Engineers (ANSI/ IEEE) 802.1X or ANSI/IEEE 802.11i standards utilize such a centralized procedure to control access to network resources.

IEEE 802.1X is an IEEE standard initially designed to provide authentication, access control, and key management in both wired and wireless networks. Three entities defined in 802.1X are a Supplicant, an Authenticator and an Authentication Server (AS). The Supplicant is the node seeking authentication and access authorization. The Access Server (AS), sometimes referred to as the Authentication, Authorization and Accounting (AAA) Server, authenticates and grants access, if authorized, to a Supplicant based on the Supplicant's credentials. An AS can be co-located with an Authenticator. Authentication is conducted between the Supplicant and the Authentication Server while the Authenticator acts as a pass-through of the authentication messages. The Authenticator has an uncontrolled port and a controlled port for every client. Before a client is authenticated, only authentication messages are allowed to pass through the uncontrolled port. Only after the Supplicant is successfully authenticated can other traffic be passed via the controlled port.

A protocol used for these communications between the Supplicant and the Authentication Server is EAP (Extensible Authentication Protocol). For 802.1X, EAP messages between the Supplicant and the Authenticator are encapsulated in EAPOL (EAP over local area network (LAN)) message formats. EAP is flexible and extensible in supporting multiple authentication mechanisms such as user password, certificate based authentication, one time password, authentication token or smart card, and the like. It provides a vehicle to negotiate and use appropriate authentication mechanisms including those which derive keying material at the Supplicant and the AS.

An authentication procedure can begin when a node transmits an authentication request using, for example, an Extensible Authentication Protocol (EAP) comprising EAP Over Local Area Network (EAPOL) packets. The authentication process involves several EAPOL packets being transmitted and received, beginning with an EAP start packet and finishing with either an EAP success message packet or an EAP failure message packet. EAP is a "lock step" protocol in that a new request cannot be sent prior to receiving a valid response. See [RFC 3748].

The authentication server stores the authentication credentials of a mobile device (typically called a Supplicant) that is being authenticated. Authentication servers also can be connected to other authentication servers to obtain Supplicant authentication credentials that are not stored locally.

As described in the "IEEE Standard for Information technology—Telecommunications and information exchange between systems—Local and metropolitan area networks— Specific requirements—Part 11: Wireless LAN Medium Access Control (MAC) and Physical Layer (PHY) specifications—Amendment 6: Medium Access Control (MAC) Security Enhancements", ANSI/IEEE 802.11i-2004, July 2004, Supplicants (or nodes seeking to authenticate and gain access) are assumed to be one hop from the Authenticator (e.g., an access point (AP)) which grants or refuses access. Traditional 802.11i does not contemplate multi-hop communication between the Supplicant and the Authenticator. Because every Supplicant can be authenticated only via an AP, such a centralized procedure requiring single hop communications between the Supplicant and an AP providing bridging services between the mobile wireless network and a wired backhaul network might not be practical in multi-hop ad hoc wireless communication networks that have nodes outside of the wireless communication range of an AP.

BRIEF DESCRIPTION OF THE FIGURES

The accompanying figures together with the detailed description below form part of the specification, and serve to further illustrate various embodiments and to explain various principles and advantages all in accordance with the present invention.

Figure 1:
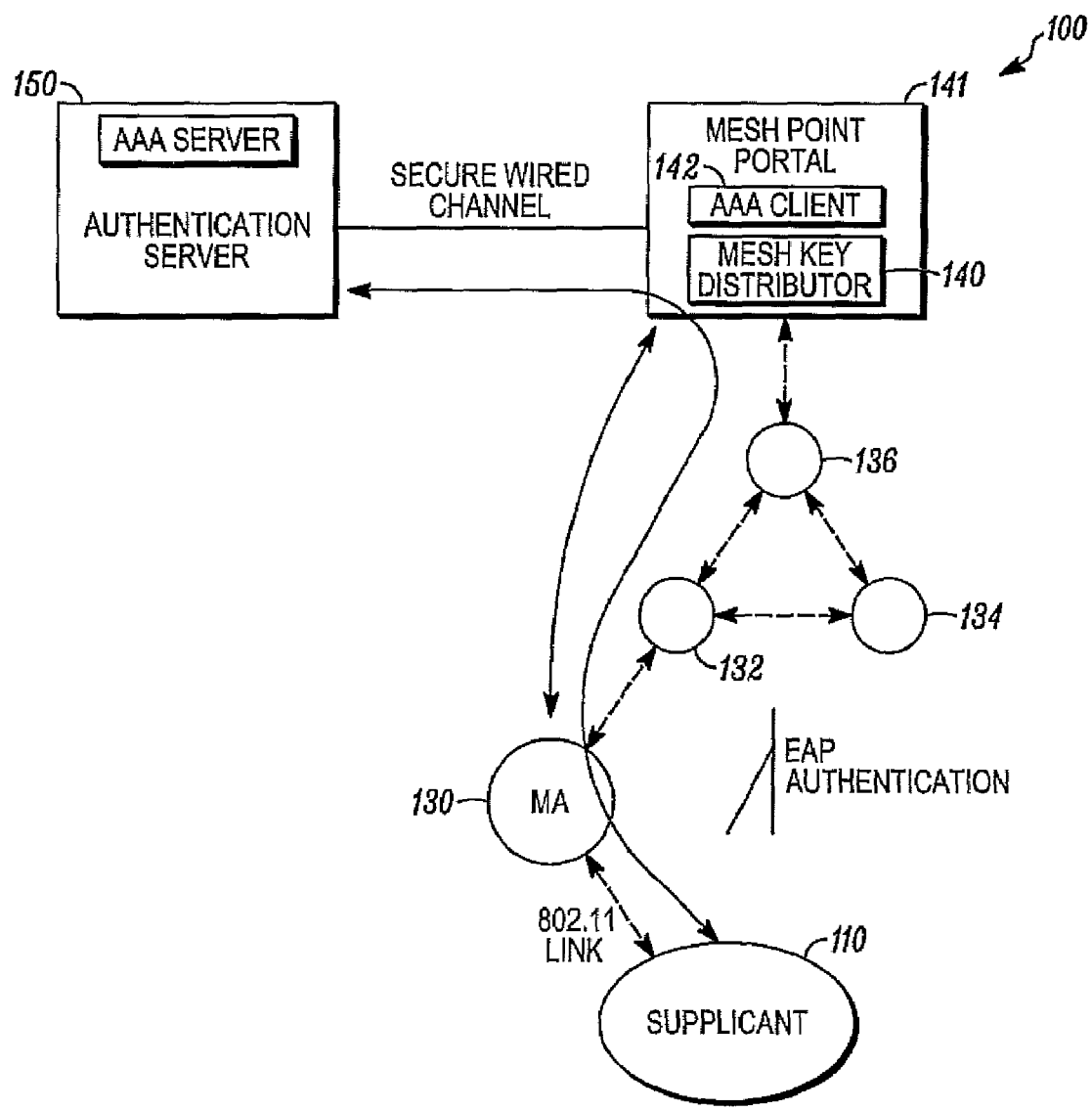
FIG. 1 is a block diagram of an exemplary communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing a secure link between a mesh authenticator and a mesh key distributor for transporting security association messages, such as, Extensible Authentication Protocol (EAP) messages. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for establishing a secure link between a mesh authenticator and a mesh key distributor for transporting security association messages, such as, Extensible Authentication Protocol (EAP) messages as described herein. The non-processor circuits may include, but are not limited to, a radio receiver, a radio transmitter, signal drivers, clock circuits, power source circuits, and user input devices. As such, these functions may be interpreted as steps of a method for establishing a secure link between a mesh authenticator and a mesh key distributor for transporting security association messages, such as, Extensible Authentication Protocol (EAP) messages. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Acronyms

The following description uses at least some of the following acronyms:

EAPIE EAP Encapsulation information element
EMSA Efficient Mesh Security Association
EMSAIE EMSA Handshake information element
KCK-KD Key confirmation key for key distribution
KDK Key Distribution Key
KEK-KD Key encryption key for key distribution
MA Mesh Authenticator
MA-ID Mesh Authenticator Identifier
MEKIE Mesh encrypted key information element
MKD Mesh Key Distributor
MKD-ID Mesh Key Distributor Identifier
MKHSIE Mesh key holder security information element
MSD-ID Mesh Security Domain Identifier
MSDIE Mesh Security Domain information element
PMK Pairwise Master Key
PMK-MA Mesh Authenticator PMK
PMK-MKD Mesh Key Distributor PMK
PTK-KD Pairwise transient key for key distribution Exemplary Ad Hoc Multi-Hopping Network FIG. 1 is a block diagram of an exemplary ad hoc multi-hop communication network 100. As used herein, the term "multi-hop communication network" refers to any type of wireless network which employs routing protocols among nodes which are part of a network. The network 100 comprises a plurality of nodes or "mesh points (MPs)" 110, 132, 134, 136, a mesh authenticator (MA) node 130, a mesh key distributor (MKD) 140 which can be implemented at, for example, a mesh point portal (MPP) 141, a authentication, authorization, and accounting client (AAA client) 142, which also can be implemented at a MPP 141, and an authentication server (AS) 150 which can be implemented at, for example, a authentication, authorization, and accounting server (AAA server). In the particular network configuration shown in FIG. 1, node 110 is also referred to as a "Supplicant node or Supplicant mesh node."

Because the number of nodes that that may reside within the neighborhood of a supplicant mesh point 110 can be large, and because a security association is required before a node may send a routing message to its neighbor, it is important that a mechanism be in place at each mesh authenticator 130 allowing it to communicate with a mesh key distributor 140 to obtain derived keys based upon the key material created by a supplicant mesh point 110 during its first contact and authentication with the mesh network and allowing the mesh authenticator 130 to provide the supplicant mesh point 110 with the information it requires to identify this key material and request it be used to complete an efficient security association exchange.

The present invention includes a mesh authenticator mechanism supporting the efficient establishment of security associations. This mechanism can operate in either mesh supplicant or mesh authenticator roles, depending upon the capabilities and preferences of its neighbors, and when operating in the mesh authenticator role can relay EAP authentication messages and request key transfers from a mesh key distributor. When implemented in accordance with the present invention, the mesh authenticator broadcasts information allowing supplicant mesh points to join a mesh and establish security associations with itself and a mesh key distributor. It also maintains keys from a key delivery hierarchy that allow it to request and unwrap keys used to establish a security association with supplicant mesh point neighbors. Finally, the authenticator supports the transport of extensible authentication protocol (EAP) authentication messages from supplicant mesh points to a key distributor and supports the delivery of key material from the mesh key distributor.

In the exemplary ad hoc multi-hop communication network 100 shown in FIG. 1, the infrastructure or "wired" portion of the network includes the mesh point portal (MPP) 141 which is coupled to the AS 150 by a secure wired channel. Although not shown in FIG. 1, the mesh point portal 141 can be coupled to the AS 150 via a router or other entities (not shown). In this exemplary network, the mesh key distributor (MKD) 140 and the AAA-client 142 are implemented at the mesh point portal (MPP) 141 and coupled using inter-processes messages. In this exemplary network configuration, node 136 is one hop from the MPP 141, nodes 132, 134 are two hops from the MPP 141, node 130 is three hops from the MPP 141, and node 110 is four hops from the MPP 141. In some embodiments of the present invention, the mesh point portal 141 implementing the MKD entity also implements a MA entity.

In the exemplary ad hoc multi-hop communication network 100 illustrated in FIG. 1., the mesh key distributor 140 is coupled to a authentication, authorization, and accounting client (AAA-client) 142, which in turn is coupled communicatively to a authentication, authorization, and accounting server (AAA-sever) 150. The MKD 140: (a) provides EAP authentication message forwarding services to and from the MA and to and from the AAA-client; (b) derives and delivers derived keys to one or more mesh authenticators 140, allowing a supplicant 110 to join the ad hoc network 100 or establish new security associations; (c) derives a pairwise transient key for key distribution (PTK-KD) that allows the MA 130 to request and unwrap keys used to establish a security association with supplicant mesh point neighbors and to insert and validate message integrity check values used to confirm data origin authenticity and message integrity of key delivery and EAP authentication messages.

The mesh key distributor 140 maintains two sets of derived keys, one set for communicating with mesh authenticators and one set for key delivery to mesh authenticators to allow supplicant mesh point to join the ad hoc network or establish new security associations. These sets of derived keys are created from a single master key created when the mesh authenticator, during its first contact with the mesh network, performed EAP authentication with the authentication, authorization, and accounting (AAA) server. This offers an efficient method to set up a mesh authenticator, rather than requiring an explicit, separate authentication for the mesh authenticator role. The presence of a mesh key distributor in the exemplary ad hoc multi-hop communication network 100 defines a mesh security domain. Within the mesh security domain, several mesh authenticators MAs 130 may exist, each implemented at an MP, and each MA maintains both a route to and a security association with the MKD 140.

The mesh key distributor 140 communicates with a Mesh Authenticator 130 using layer 2 protocols and predefined data frames. The ability of the mesh key distributor 140 to employ layer 2 protocols for communicating with the mesh authenticator allow the security protocols required to implement efficient mesh security associations. In some embodiments of the present invention, the mesh key distributor (MKDs) 140 for a plurality of mesh authenticators 130 in a mesh security domain may be implemented in a central controller residing on a wired network and reachable to the plurality of mesh authenticators via a plurality of mesh points providing mesh portal services.

Communicatively coupled to the mesh key distributor 140 is at least one mesh authenticator (MA) 130. Although one mesh authenticator 130 is illustrated in the exemplary ad hoc multi-hop communication network 100 of FIG. 1, it will be appreciated that one or any plurality of mesh authenticators can be utilized in accordance with the present invention. The mesh authenticator 130: (a) advertises services enabling supplicants (i.e. mesh point (MP) supplicant 110) to join; (b) provides EAP authentication message forwarding services; (c) requests or obtains derived keys from the mesh key distributor 140, allowing a supplicant 110 to join the ad hoc network 100 or establish new security associations; (d) derives a pairwise transient key (PTK) to secure a link with a supplicant 110; and (e) derives a pairwise transient key for key distribution (PTK-KD) that allows the MA 130 to request and unwrap keys used to establish a security association with supplicant mesh point neighbors and to insert and validate message integrity check values used to confirm data origin authenticity and message integrity of key delivery and EAP authentication messages.

The mesh authenticator 130 provided for in the present invention maintains two sets of derived keys, one for key transport between itself and a key distributor and a second set for communications with its peers. These sets of derived keys are created from a single master key created when the mesh authenticator, during its first contact with the mesh network, performed EAP authentication with the authentication, authorization, and accounting (AAA) server. This offers an efficient method to set up a mesh authenticator, rather than requiring an explicit, separate authentication for the mesh authenticator role. The authenticator broadcasts information used by supplicant mesh points to select a mesh point authenticator in the mesh security domain that permits the use of the key hierarchy it created during first contact. It also communicates with a key distributor using layer 2 protocols and predefined data frames. The ability of the mesh authenticator to employ layer 2 protocols for communicating with the mesh key distributor allow the security protocols required to implement efficient mesh security associations.

The nodes 110, 130, 132, 134, 136 typically support simultaneous operation in both infrastructureless mode and infrastructured mode and can move seamlessly between infrastructure-based networks (those including, for example, a mesh point portal 141) and client-based peer-to-peer networks which are free of any infrastructure. For example, an ad hoc multi-hopping communication network 100 can be created between a plurality of nodes 110, 130, 132, 134, 136 (each having wireless repeater and/or routing capability), and optionally a wired mesh point portal (MPP) 141. It will be appreciated by those of ordinary skill in the art that while the ad hoc network 100 in FIG. 1 is shown as operating in an infrastructure mode (e.g., including a mesh point portal (MPP) 141), the ad hoc network 100 of FIG. 1 does not require any network infrastructure to be present.

In the ad hoc multi-hopping network 100, communications to and/or from nodes 110, 130, 132, 134, 136 can "hop" through each other to reach other nodes 110, 130, 132, 134, 136 in the network. The nodes 110, 130, 132, 134, 136 can generally be wireless devices designed to allow receiving of packetized audio, video and/or data information. Some of the components in an exemplary node, such as an exemplary processor, transmitter, receiver and antenna, are described below in FIG. 2. The nodes 110, 130, 132, 134, 136 can exchange information as data packets transmitted over carrier frequencies, each of which includes one or more wireless communication channels.

In infrastructure mode, the MPP 141 is typically coupled to a wired network (not shown) and can provide one or more sources of audio, video and/or data information. The MPP 141 may be, for example, a cellular base station or other wireless access point.

Although not shown in FIG. 1, it will be appreciated by those of ordinary skill in the art that the nodes 110, 130, 132, 134, 136, can also communicate information packets with a cellular-based network (not shown) over wireless communication medium, each of which includes one or more wireless communication channels depending on the multiple access scheme utilized in the cellular-based network.

When the Supplicant node 110 attempts to join the mesh network 100, the Supplicant node 110 needs to exchange EAP authentication traffic with the authentication server (AS) 150. For instance, in one approach for establishing security associations in a mesh network, at first contact when joining a mesh network 100, the Supplicant node 110 contacts a mesh authenticator (MA) 130 (implemented at a neighboring node) in order to begin EAP authentication with the on-line AAA server 150. However, in this approach, the mesh authenticator node 130 does not provide the AAA-client service, but instead communicates with a mesh key distributor 140 to obtain derived key material for the supplicant node 110. In addition to other functionality, the mesh key distributor 140 is coupled to a AAA-client 142 which communicates with the AS 150 on behalf of the nodes in the mesh network.

In many cases, such as shown in FIG. 1, the mesh authenticator (MA) 130 may be located multiple wireless hops from the mesh key distributor (MKD) 140. Thus, EAP messages from the Supplicant node 110 are sent from the mesh authenticator node 130 to the mesh key distributor 140, and EAP messages are also transported in the reverse direction. In other words, the EAP traffic received from the Supplicant node 110 by the MA 130 is transported to the MKD 140 in order to be sent to the AS 150 by the AAA client 142 coupled to the MKD 140. Likewise, the EAP traffic from the AS 150 is received by the AAA client 142 coupled to the MKD 140, and then must be transported from the MKD 140 to the MA 130 before being sent to the Supplicant node 110.

Figure 2:
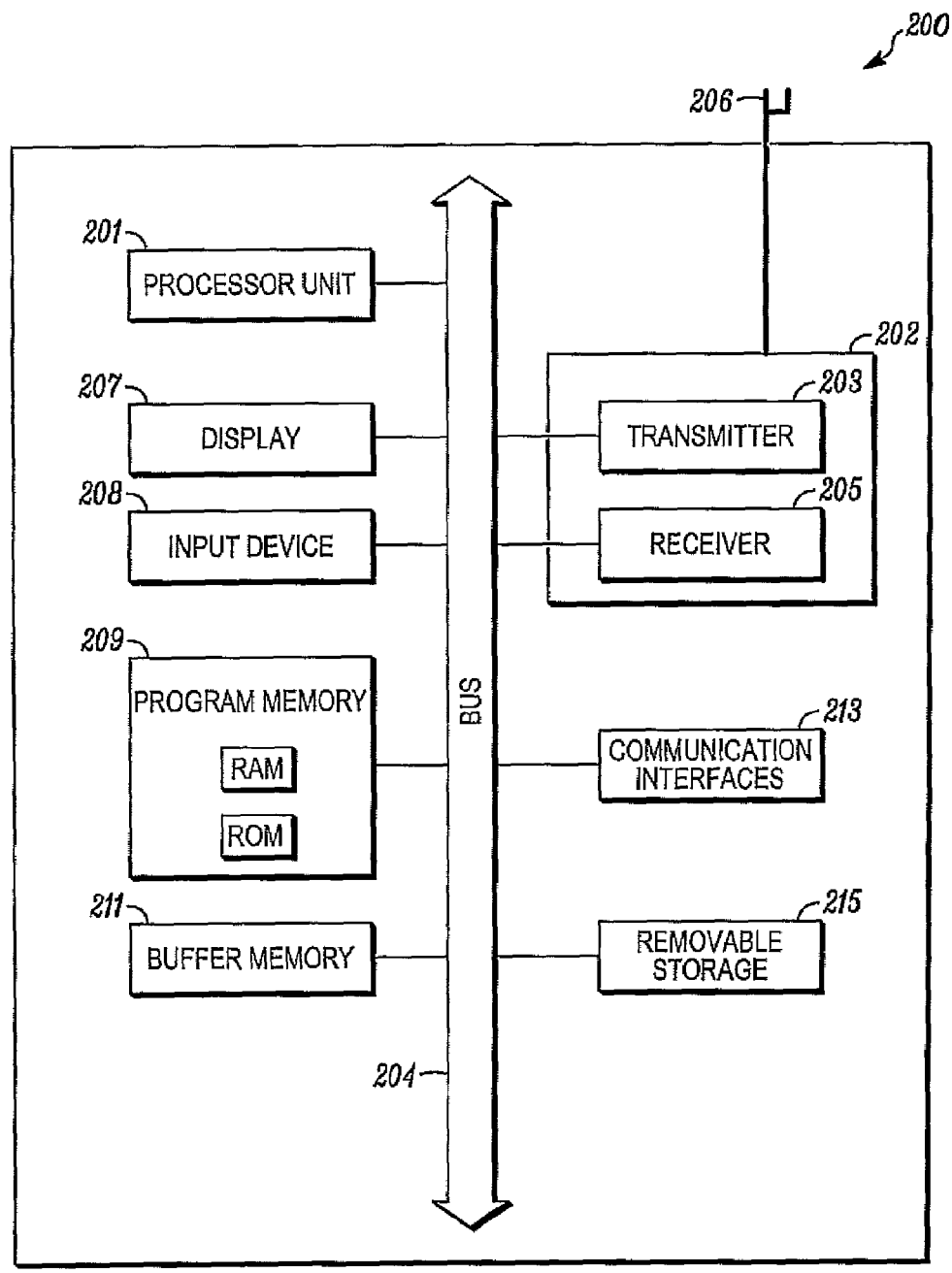
FIG. 2 is a block diagram of an exemplary node for use in the operation of some embodiments of the invention.

A description of some of the components of an exemplary node will now be provided with respect to FIG. 2.

Exemplary Node

FIG. 2 is a block diagram of an exemplary node 200. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of RF signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within two or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 preferably further includes a video decoder designed to allow decoding the current Moving Picture Experts Group (MPEG) standard or some other video decoding standard. When the node 200 is further designed to allow transmitting video information, the node 200 preferably further includes a video encoder designed to allow encoding the video data into at least one of the foregoing video standards. Such a video encoder and decoder are preferably implemented as part of the processor 201.

Overview

To enhance security in the network 100, it would be desirable to provide a mechanism for securely transporting EAP messages between the mesh authenticator node 130 and mesh key distributor 140. From an interoperability standpoint, it would be desirable to provide mechanisms for securely transporting EAP messages that operate at layer 2 or below since such mechanisms can provide different equipment vendors with a common technique for transporting EAP messages thereby allowing nodes and equipment from different equipment vendors to interoperate.

Techniques and technologies are provided for establishing a secure link (or tunnel) between the mesh authenticator node 130 and mesh key distributor 140 for transporting security association messages, such as, Extensible Authentication Protocol (EAP) security messages between the mesh authenticator node 130 and the mesh key distributor 140. This secure link (or tunnel) implemented in accordance with the present invention can allow the mesh key distributor 140 to communicate the results of an on-line authentication process (e.g., authentication success and failure) to the mesh authenticator node 130.

A security message transport protocol is also provided which employs a specific type of mesh management frame called a "mesh action" frame for transporting the messages. In one non-limiting, exemplary implementation, the disclosed security message transport protocol can be applied in the context of devices and networks which comply with IEEE 802.11 standards such as IEEE 802.11s.

A "mesh action" frame is used to transport management traffic across one or more mesh links. The mesh action frame type distinguishes the message from a data frame, permitting the contents to be processed by the appropriate internal function. The mesh action frame allows mesh nodes to distinguish between user traffic and management traffic to allow for efficient forwarding over a mesh since nodes may forward traffic without examining the contents of the frame being forwarded. Intermediate nodes forwarding a mesh action frame to its destination node can process the frame in the same manner as a mesh data frame. The destination node can use the "mesh action" frame type to facilitate processing upon receiving the frame.

A mesh action frame contains category and action fields, followed by message contents. The numeric values in the category and action fields uniquely specify the format of the message contents, which may include information elements. To protect the message contents, the mesh action data frame's contents are encrypted at each hop using the same mechanism as mesh data frames.

Referring again to FIG. 1, the mesh authenticator node 130 and mesh key distributor 140 can transmit mesh action frames to each other once a supplicant node 110 begins EAP authentication with the mesh authenticator node 130. The category and action value of the message are set to specific values to allow the contents of the mesh action frames to be customized to the EAP transport application. For instance, the mesh authenticator node can generate a particular mesh action frame which specifies a "mesh security" category and "mesh EAP encapsulation" action value.

Among other features, the disclosed techniques and technologies can implement additional fields in the EAP encapsulation frame to allow information to be exchanged between the mesh authenticator node 130 and mesh key distributor 140 that is essential for the correct operation of the protocol and to ensure end-to-end integrity of message delivery. For example, this particular mesh action frame comprises: a message integrity check (MIC) field for integrity checking, a special EAP message type field, a message token in each frame that can be used to match pairs of request and response frames, a field specifying an address of the supplicant node 110, and an EAP frame generated by the supplicant node 110.

The message integrity check (MIC) field protects the EAP message from modification. The MIC ensures that a valid EAP message is passed to the Supplicant node 110 from the MA 130, or is passed to the authentication server (AS) 150 from the MKD 140. The special EAP message types are defined for the final response message for communicating authentication result messages, such as a security association accept message or a security association reject message to provide additional information to the MA 130. The special EAP message types correspond to RADIUS codes [RFC 2865] for simple assignment at the MKD 140. The security association "accept" EAP message type and the security association "reject" EAP message type provide indication to the MA 130 to perform appropriate action with the authenticating supplicant node 110. EAP message types are integrity protected (via the MIC) since they impact access control behaviors at the MA. Because the message token allows for matching request messages to response messages, it enables a lockstep protocol that is compatible with EAP.

According to the protocol, when an EAP message within an EAPOL packet is received by the mesh authenticator node 130, the mesh authenticator node 130 transmits the particular mesh action frame to the mesh key distributor 140. Upon receiving the particular mesh action frame, the mesh key distributor 140 can forward the contents of the message to an on-line AAA server 150, using a security message transport protocol such as Radius, and reply to the mesh authenticator node 130 with a response. Alternatively, the mesh key distributor 140 can act as a proxy for an on-line Radius client, and forward the contents of the message to the on-line Radius client using any proprietary message transport protocol for further processing and protocol conversion.

Figure 3:
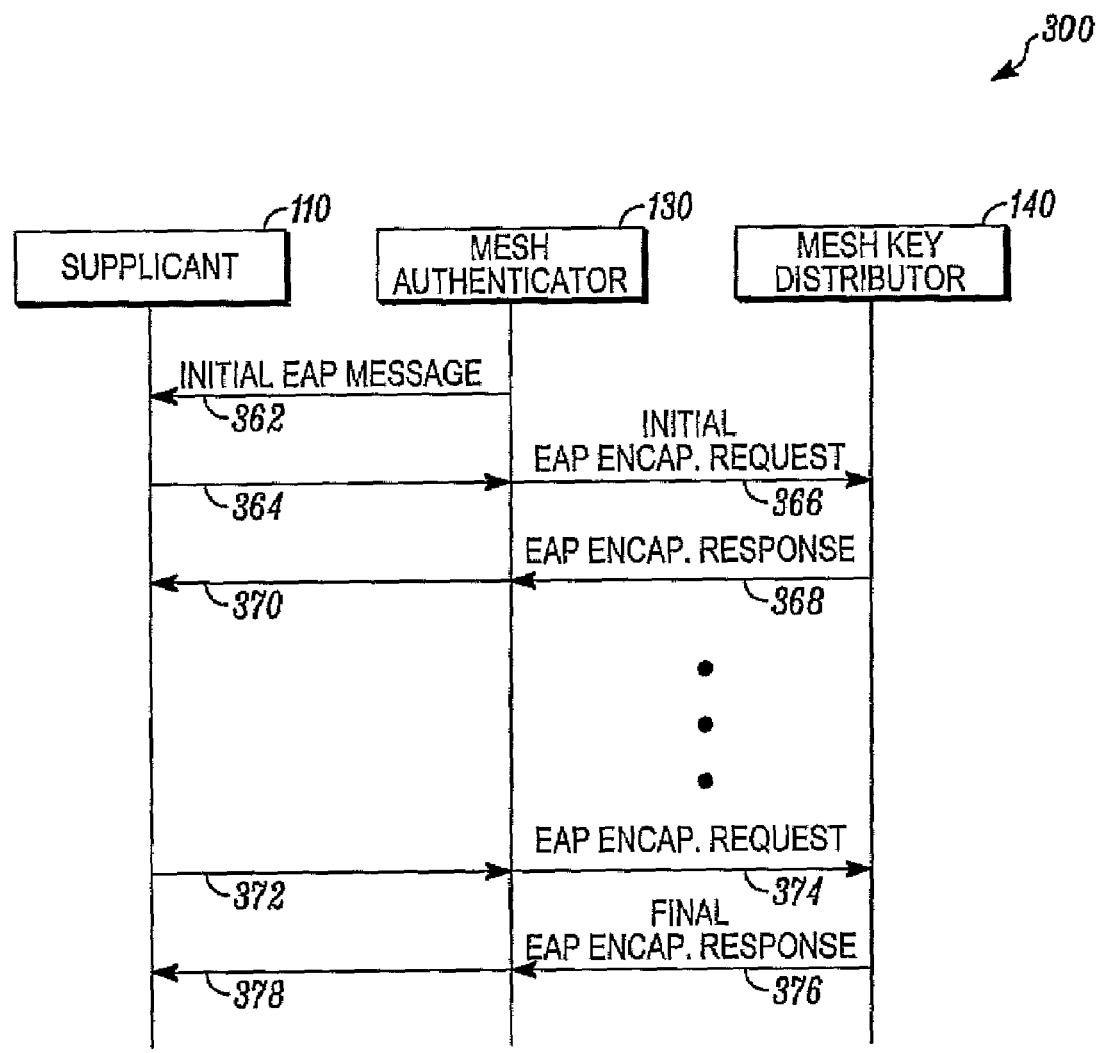
FIG. 3 is a message flow diagram showing a protocol for EAP encapsulation process for providing a secure channel or link between a mesh authenticator node and a mesh key distributor 140 during authentication of a supplicant node in accordance with some embodiments of the invention.

FIG. 3 is a message flow diagram showing a protocol for EAP encapsulation process 300 for providing a secure channel or link between a mesh authenticator node 130 and a mesh key distributor 140 during authentication of a supplicant node 110 in accordance with some embodiments of the invention.

The process 300 begins at step 362 when the mesh authenticator node 130 initiates IEEE 802.1X authentication with the Supplicant node 110 by sending an initial EAP message to the supplicant node 110. The initial EAP message is carried within an EAPOL packet.

At step 364, the supplicant node 110 responds to the initial EAP message by transmitting an EAP message within an EAPOL packet to the MA node 130 in order to continue authentication between the mesh authenticator node 130 and supplicant node 110.

As used herein, the term "EAP encapsulation request message" refers to an EAP Encapsulation mesh action message with EAP message type "request." The term "EAP encapsulation response message" refers to an EAP Encapsulation mesh action message with EAP message type "response." The term "final EAP encapsulation response message" refers to an EAP encapsulation mesh action message with EAP message type "accept" or "reject."

When the MA node 130 receives an EAP message within an EAPOL packet from the Supplicant node 110, at step 366, the MA node 130 sends an EAP Encapsulation request message, containing the EAP message received from the supplicant node 110, to the MKD 140. The message is sent to the mesh key distributor 140 over a secure channel (e.g., tunnel) between the mesh authenticator node 130 and the mesh key distributor 140.

Upon receiving the initial EAP encapsulation request message, the mesh key distributor 140 can forward the contents of the message to an on-line AAA server 150 over a wired link using a security message transport protocol such as Radius. Alternatively, the mesh key distributor 140 can act as a proxy for an on-line Radius client, and forward the contents of the message to the on-line Radius client using any proprietary message transport protocol for further processing and protocol conversion.

At step 368, the mesh key distributor 140 receives an EAP response message destined for the Supplicant node 110 from the AS 150, and sends an EAP Encapsulation response message, containing the EAP response message received from the AS 150, to the MA node 130. The message is sent over a secure channel (e.g., tunnel) between the mesh authenticator node 130 and the mesh key distributor 140. At step 370, the mesh authenticator node 130 forwards the EAP response message, within an EAPOL packet, to the supplicant node 110.

At step 372, the supplicant node 110 responds to the EAP response message by transmitting an EAP request message within an EAPOL packet to the mesh authenticator node 130. At step 374, the mesh authenticator node 130 sends an EAP Encapsulation request message, containing the EAP message received from the supplicant node 110, to the mesh key distributor 140 over a secure channel (e.g., tunnel) between the mesh authenticator node 130 and the mesh key distributor 140. Upon receiving the EAP encapsulation request message, the mesh key distributor 140 can forward the contents of the message to an on-line AAA server 150 over a wired link using a security message transport protocol such as Radius. Alternatively, the mesh key distributor 140 can act as a proxy for an on-line Radius client, and forward the EAP encapsulation request message to the on-line Radius client using any proprietary message transport protocol for further processing and protocol conversion.

At step 376, the mesh key distributor 140 receives a final EAP response message destined for the Supplicant node 110 from the AS 150. The mesh key distributor 140 sends a final EAP Encapsulation response message, containing the EAP response message received from the AS 150, to the mesh authenticator node 130 over a secure channel (e.g., tunnel) between the mesh authenticator node 130 and the mesh key distributor 140.

The final EAP encapsulation response message contains a special EAP message type. If the EAP authentication of the Supplicant node 110 was successful and an "accept" indication was provided to the MKD, then the MKD 140 sends the final message with EAP message type "accept" to indicate to the MA 130 that the Supplicant node 110 should be granted access. For example, if the EAP authentication of the supplicant node 110 resulted in the supplicant node 110 being accepted, then the final EAP encapsulation response message can have an EAP message type (e.g., message type=2) that can be used to indicate that the supplicant node 110 is accepted. Alternatively, if EAP authentication failed, the MKD 140 sends the final message with type "reject" to the MA 130. For example, if the EAP authentication of the supplicant node 110 resulted in the supplicant node 110 being rejected, then the final EAP encapsulation response message can have an EAP message type (e.g., message type=3) which indicates that the supplicant node 110 is rejected. Upon reception of a final EAP Encapsulation response message of type "reject," the MA 130 terminates the association with the Supplicant node 110.

At step 378, the mesh authenticator node 130 forwards the final EAP response message, within an EAPOL packet, to the supplicant node 110.

Figure 4:
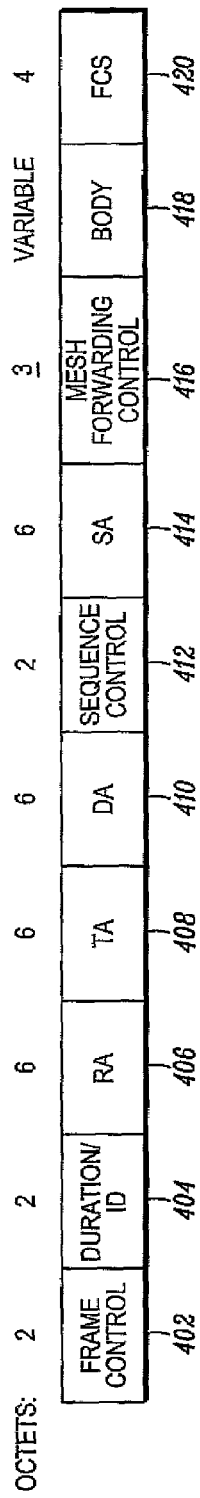
FIG. 4 is a data structure showing a format of a mesh management frame in accordance with some embodiments of the invention.

FIG. 4 is a data structure showing a format of a mesh management frame 400 in accordance with some embodiments of the invention. The mesh management frame 400 comprises a frame control field 402, a duration field 404, a receiver address field 406, a transmitter address field 408, a destination address field 410, a sequence control field 412, a source address field 414, a mesh forwarding control field 416, a body field 418 and a FCS field 420.

The frame control field 402 contains information required to identify the frame as a mesh management frame. Further, the frame control field contains a Protected Frame subfield which may indicate that the message body 418 is encrypted.

The duration field 404 contains a duration time value that is proportional to the length of the frame in bits. The duration value calculation for the mesh management frame is based on the rules that determine the data rate at which the control frames in the frame exchange sequence are transmitted.

The mesh management frame 400 comprises four address fields including the receiver address field 406, the transmitter address field 408, the destination address field 410, and the source address field 414. The receiver address field 406 is the unicast address of the node (or "mesh point") that is the immediate intended receiver of the frame or the multicast or broadcast address of the nodes (or "mesh points") that are the immediate intended receivers of the frame. The transmitter address field 408 is the address of the node (or "mesh point") that is transmitting the frame. The destination address field 410 is the destination of the Mesh Action Data Unit in the Frame Body field. The source address field 414 is the address of the node (or "mesh point") that initiated the Mesh Action Data Unit in the Frame Body field. A node (or "mesh point") uses the contents of the RA field 406 to perform address matching for receive decisions. In cases where the RA field 406 contains a group address, the SA 414 is also validated to ensure that the broadcast or multicast originated from a node (or "mesh point") with which the receiving node (or "mesh point") has an established link. A node (or "mesh point") uses the contents of the TA field 408 to direct the acknowledgment if an acknowledgment is necessary.

The sequence control field 412 value is set by a transmitting mesh point to permit the receiving mesh point to correctly process received frames by placing received frames in the order in which they were sent and to eliminate duplicate received frames.

The mesh forwarding control field 416 contains a numeric end-to-end sequence number value and a time-to-live value. The end-to-end sequence number value permits the destination node to properly order Mesh Action Data Units received from a source node. The time-to-live field mitigates the possibility of certain routing errors in a mesh network.

The body field 418 comprises Mesh Action Data Units and a security header and a security trailer (if and only if the Protected Frame subfield in the Frame Control field is set to 1). The Mesh Action Data Unit contains the Mesh Action field which will be described in more detail below with reference to FIG. 5. The Mesh Action field comprises Category and Action Value fields followed by the information elements defined for each Mesh Action.

The FCS field 420 contains a cyclic redundancy check to detect errors in the frame which may have occurred during transmission.

Figure 5:
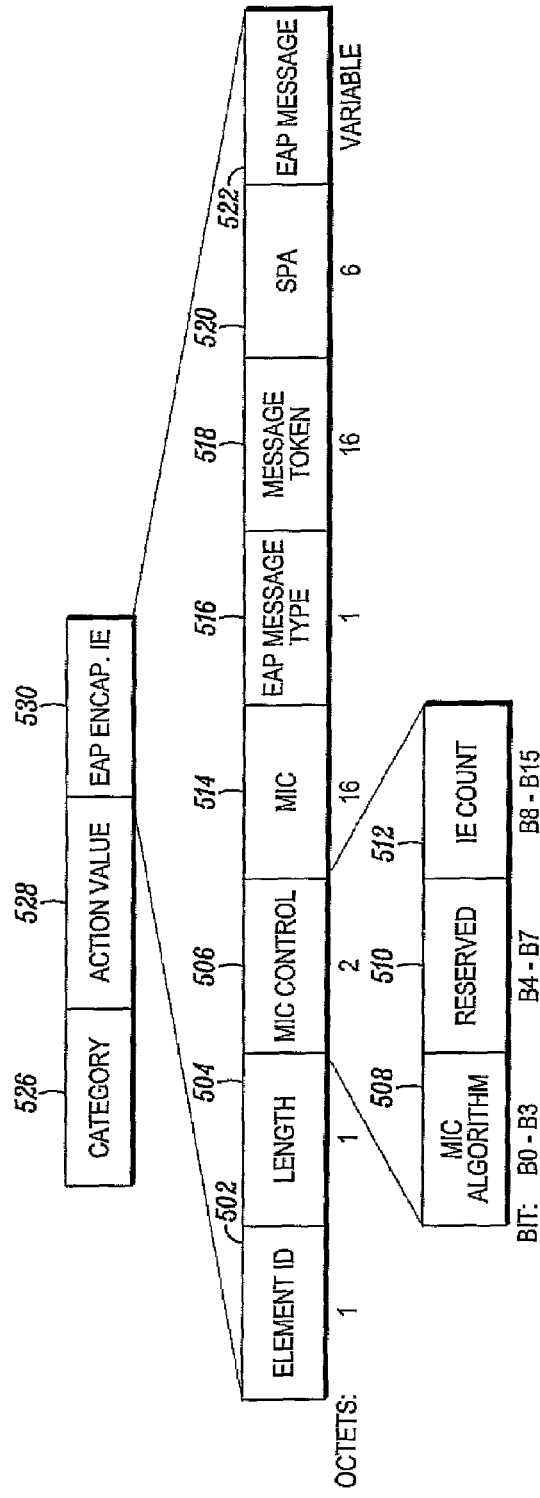
FIG. 5 is a data structure showing a format of a generic EAP encapsulation authentication message in accordance with some embodiments of the invention.

FIG. 5 is a data structure showing a format of a generic EAP encapsulation mesh action message 500 in accordance with some embodiments of the invention. The EAP encapsulation mesh action message 500 comprises a category field 526 (e.g., category 0) and mesh action details comprising an action value 528 (e.g., action value 6) and an EAP encapsulation information element (EAPIE) 530. The EAP encapsulation mesh action message is a particular type of mesh action frame. The EAP encapsulation information element 530 is an information element used to provide transport of an EAP message and related security information, and to provide integrity protection.

The EAP encapsulation information element 530 comprises an element identifier (ID) field 502, a length field 504, a Message Integrity Check (MIC) control field 506, a message integrity check (MIC) field 514, an EAP message type field 516, a message token field 518, a supplicant address (SPA) field 520 and a EAP message field 522. The fields in the EAP encapsulation frame 530 can allow information to be exchanged between the mesh authenticator node 130 and mesh key distributor 140 that is essential for the correct operation of the protocol and to ensure end-to-end integrity of message delivery.

The length field 504 contains indicates the number of octets in the information fields 506-522 following the element ID 502 and length 504 fields.

The MIC control field 506 comprises a MIC algorithm field 508, a reserved field 510 and an information element (IE) count field 512. The IE count field 512 of the MIC control field 506 indicates the number of information elements that are protected by the MIC and included in the MIC calculation. A value of zero indicates no MIC is present. The MIC algorithm field 508 is used to select an available algorithm for calculating the MIC. For example, the MIC algorithm field 508 may contain a value which corresponds to a particular MIC algorithm, such as HMAC-MD5, as defined by IETF RFC 2104 and IETF RFC 1321.

The MIC field 514 contains a message integrity check value for integrity checking. The MIC field 514 is calculated using a pairwise key and the algorithm selected by the MIC algorithm field 508 of the MIC control field 506. The message integrity check (MIC) field 514 protects contents of this IE (e.g., the EAP message) and additional header information (e.g., destination address 410 and source address 414) from modification. The message integrity check (MIC) field 514 ensures that a valid EAP message is passed to the Supplicant node 110 from the MA 130, or is passed to the authentication server (AS) 150 from the MKD 140.

The EAP message type field 516 identifies the type of EAP encapsulation message, and differentiates between request messages and response messages. Response messages are further differentiated into three subtypes. Special message types are defined for the final response message for communicating information about the result of the EAP authentication, such as a security association accept message or security association reject message to provide additional information to the MA 130. The special message types correspond to RADIUS codes [RFC 2865] for simple assignment at the MKD 140. The association "accept" message type and the association "reject" message type provide indication to the MA 130 to perform appropriate action with the authenticating supplicant node 110. Message types are integrity protected (via the MIC) since they impact access control behaviors at the MA.

The message token field 518 in each frame can be used to match response messages to request messages (e.g., match pairs of request and response frames). In a request message (e.g., messages having a request type), the message token field 518 contains a random nonce. In a response message (e.g., messages having a response message type, a security association accept message type, and a security association reject message type), the message token field 518 contains the value of the message token field in the corresponding request message (e.g., value of the message token field in the request message to which the response message corresponds).

Because the message token allows for matching request messages to response messages, it enables a lock-step protocol that is compatible with EAP.

The SPA field 520 contains a medium access control (MAC) address of the supplicant node 110 that is undergoing EAP authentication. The EAP message field 522 contains an EAP packet with format as defined in IETF RFC 3748.

Figure 6:
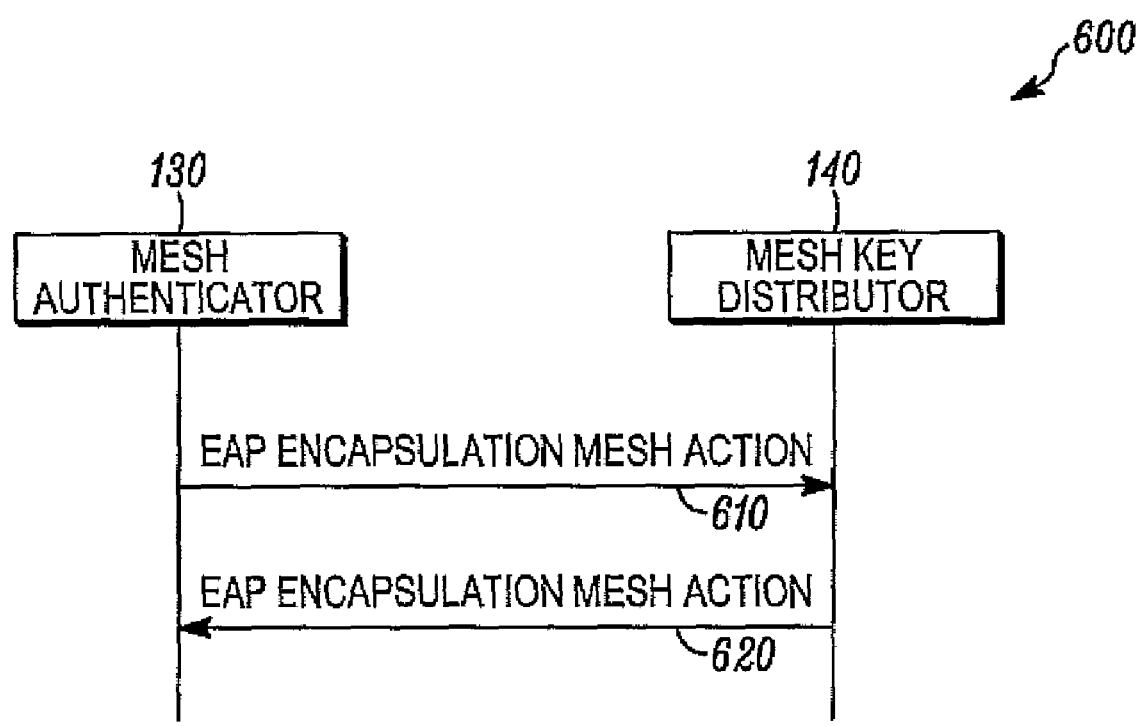
FIG. 6 is a message flow diagram showing a mesh EAP message transport protocol in accordance with some embodiments of the invention.

FIG. 6 is a message flow diagram showing a mesh EAP message transport protocol 600 in accordance with some embodiments of the invention. The mesh EAP message transport protocol 600 describes how the MA 130 initiates and performs EAP authentication with the Supplicant node 110 during the Supplicant node's initial Efficient Mesh Security Association (EMSA) authentication. The mesh EAP message transport protocol 600 permits transport of EAP request message (originated by the Supplicant node 110 and intended for the AS 150), and transport of EAP response messages (originated by the AS 150 and intended for the Supplicant node 110) through a mesh network between the MA 130 and the MKD 140.

The mesh EAP message transport protocol 600 can utilize a mesh action frame to relay EAP authentication messages between mesh key holders to permit a joining supplicant node 110 to authenticate with a central AS 150.

At step 610, the MA 130 sends an EAP encapsulation mesh action message (e.g., frame) to the mesh key distributor 140 either to transport an EAP message from the Supplicant node 110, or to request the AS to initiate EAP authentication ("EAP-Start"). The EAP encapsulation mesh action request message transmitted at step 610 comprises a category field (e.g., category 0) and mesh action details comprising an action value (e.g., action value 6 to indicate EAP Encapsulation message) and an EAP encapsulation information element 530. The MAC address of the MKD 140 is asserted in the DA field of the message header, and the MAC address of the MA 130 is asserted in the SA field of the message header.

When the EAP encapsulation mesh action message sent by the MA 130 is an EAP encapsulation request message, the EAP encapsulation information element comprises an element identifier (ID) field which identifies the element as an EAP encapsulation IE; a length field; a Message Integrity Check (MIC) control field which comprises a MIC algorithm field used to select an available algorithm for calculating the MIC, a reserved field and an information element (IE) count field which specifies that one IE is protected by the MIC and included in the MIC calculation; a message integrity check (MIC) field which contains a message integrity check value for integrity checking and ensures that a valid EAP message is passed to the authentication server (AS) 150 from the MKD 140; an EAP message type field which specifies that the message type is a request (e.g., with value 1); a message token field which specifies a unique nonce value chosen by MA node 130; a supplicant address (SPA) field which specifies the MAC address of the Supplicant node 110 participating in the EAP authentication; and an EAP message field which contains an EAP packet with format as defined in IETF RFC 3748. As noted above, the message integrity check (MIC) field 514 protects contents of this IE (e.g., the EAP message) and additional header information from modification. The message integrity check (MIC) field which contains a message integrity check value for integrity checking. The MIC field is calculated using a pairwise key (e.g., a security key shared between MA node 130 and MKD 140), by the algorithm selected by the MIC algorithm subfield of the MIC control field, on the concatenation in the following order, of:

MA MAC address,

MKD MAC address, contents of the EAP Encapsulation IE, with the MIC field set to 0.

When the EAP encapsulation mesh action message sent by the MA 130 is an EAP start notification message, the EAP encapsulation information element comprises many of the same fields except that the EAP message field can be omitted.

Upon receiving an EAP encapsulation request message from the MA 130, the MKD 140 verifies the MIC, and stores the message token for use in constructing EAP encapsulation response message.

At step 620, the mesh key distributor 140 responds to the request from the MA node 130 and sends an EAP encapsulation mesh action message to the MA 130 to transport an EAP message from the AS 150, and, in the final response message of a sequence, provide an indication of the success of the EAP authentication. The EAP encapsulation mesh action message (e.g., an EAP Encapsulation EMSA mesh action frame) can have one of at least three different types depending upon the context. One type is a "response" type (e.g., an EAP encapsulation mesh action response message). Another type is a "reject" type (e.g., an EAP encapsulation mesh action reject message). Another type is an "accept" type (e.g., an EAP encapsulation mesh action accept message). In these messages, the MAC address of the MA 130 can be asserted in the DA field of the message header, and the MAC address of the MKD 140 can be asserted in the SA field of the message header.

In FIG. 6, the EAP encapsulation mesh action message transmitted at step 620 comprises a category field (e.g., category 0) and mesh action details comprising an action value (e.g., action value 6 to indicate EAP Encapsulation message) and an EAP encapsulation information element such as that shown in FIG. 5.

The EAP encapsulation information element comprises an element identifier (ID) field which identifies the element as an EAP encapsulation IE; a length field which indicates the number of octets in the information fields following the element ID and length fields; a Message Integrity Check (MIC) control field which comprises a MIC algorithm field which is used to select an available algorithm for calculating the MIC, a reserved field and an information element (IE) count field which specifies that the frame includes one IE to be protected by the MIC and included in the MIC calculation; a message integrity check (MIC) field which contains a message integrity check value for integrity checking to ensure that a valid EAP message is passed to the Supplicant node 110 from the MA 130; an EAP message type field which specifies that the message type is of type response, security association accept, or security association reject (e.g., a value 2, 3, or 11); a message token field which contains the value of the message token field in the corresponding request message to which the response message corresponds (e.g., specifies a nonce value that is identical to the unique nonce value chosen by MA 130 and transmitted to the MKD 140); a supplicant address (SPA) field which specifies the MAC address of the supplicant node 110 that is undergoing or participating in the EAP authentication (e.g., the SPA field can be set to the value contained in the EAP encapsulation request message to which this EAP Encapsulation response message corresponds); and an EAP message field which contains an EAP packet with format as defined in IETF RFC 3748.

The message integrity check value in the message integrity check (MIC) field is calculated using a pairwise key (e.g., a security key shared between MA node 130 and MKD 140), by the algorithm selected by the MIC algorithm subfield of the MIC control field, on the concatenation in the following order, of:

MA MAC address,

MKD MAC address, contents of the EAP Encapsulation IE, with the MIC field set to 0.

As noted above, message type field specifies the message "type" of EAP encapsulation mesh action message (e.g., an EAP Encapsulation EMSA mesh action frame). Message types are integrity protected (via the MIC) since they impact access control behaviors at the MA 130. The EAP encapsulation mesh action message and can have one of at least three different types depending upon the context.

One type is an "accept" type (e.g., an EAP encapsulation mesh action accept message). For example, in one implementation, if the EAP encapsulation mesh action message is the final message of the sequence, and the EAP authentication of the Supplicant node 110 resulted in an "accept" indication, then the EAP message type field can be set to two (e.g., 0x02), to indicate "accept" (e.g., is a security association accept message that indicates an "acceptance" of supplicant node 110).

Another type is a "reject" type (e.g., an EAP encapsulation mesh action reject message). For example, in one implementation, if the EAP encapsulation mesh action message is the final message of the sequence, and the EAP authentication of the Supplicant node 110 resulted in a "reject" indication (e.g., a security association reject message which indicates a "rejection" of the Supplicant node 110), then the EAP message type field can be to three (e.g., 0x03), to indicate "reject."

Yet another message type is a "response" message type (e.g., an EAP encapsulation mesh action response message). For example, if the EAP encapsulation mesh action message is not an EAP encapsulation mesh action accept message or an EAP encapsulation mesh action reject message, then the EAP message type field can be set to 11 (e.g., 0x0B), to indicate a "response" message type.

Thus, the "accept" message type and the "reject" message type can thus be used to provide indication to the MA 130 to perform appropriate action when authenticating the Supplicant node 110.

Upon receiving the EAP encapsulation mesh action message from the MKD 140, the MA 130 verifies the MIC. As also noted above, the message token field in each frame can be used to match response messages to request messages (e.g., match pairs of request and response frames). As such, upon receiving the EAP encapsulation mesh action message from the MKD 140, the MA 130 also verifies that the message token received in the response message matches the value sent in the most recent request message. If the final response message receive has EAP message type "reject," the MA 130 can terminate the association with the Supplicant node 110.

The processing that takes place at the MA node 130 and at the mesh key distributor (MKD) 140 during the EAP encapsulation protocol 600 will be described further below with respect to FIGS. 7 and 8, respectively.

Figure 7:
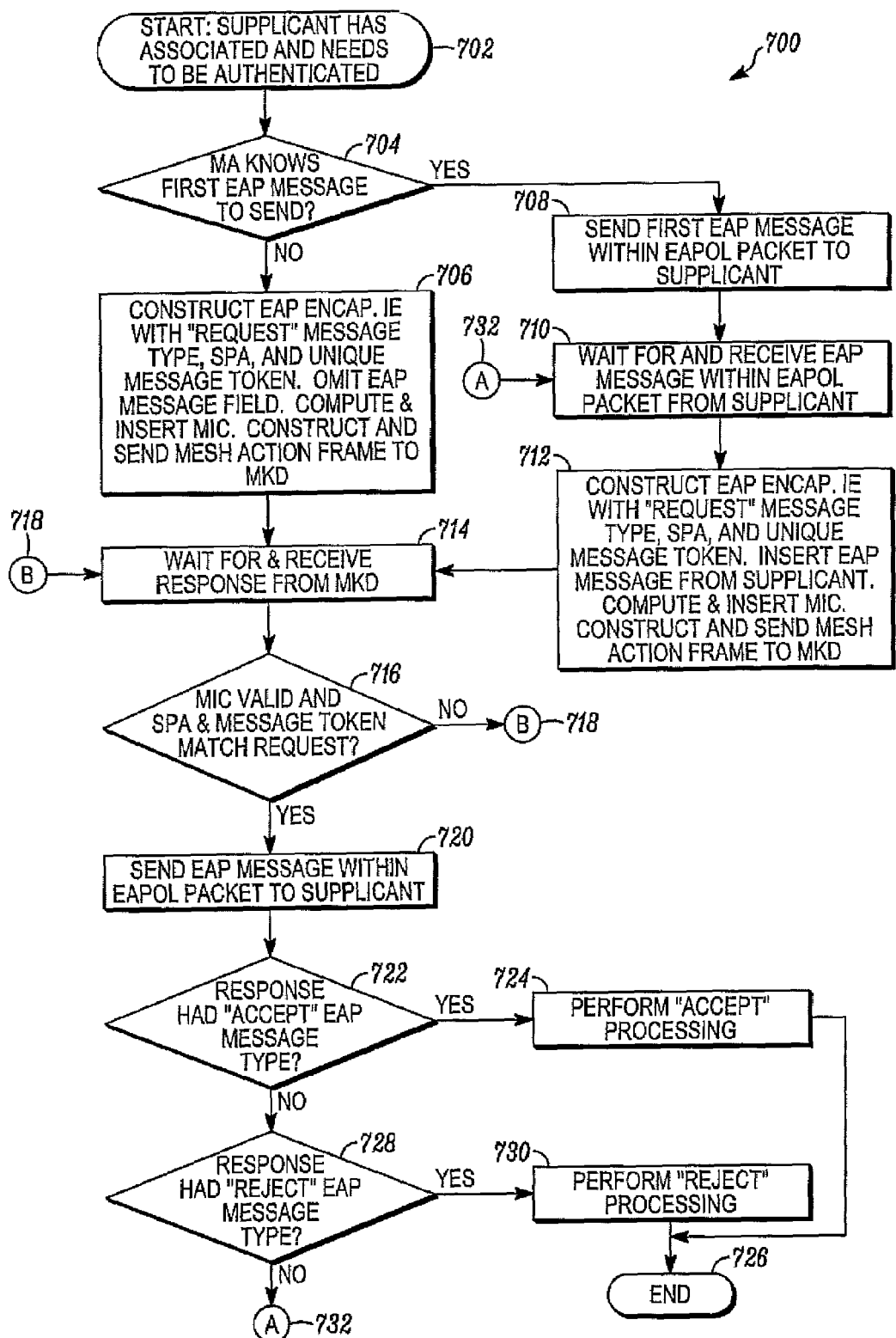
FIG. 7 is a flowchart showing an exemplary process for EAP encapsulation at a mesh authenticator (MA) in a multi-hop network in accordance with some embodiments of the invention.

FIG. 7 is a flowchart 700 showing an exemplary process 700 for EAP encapsulation at a mesh authenticator (MA) 130 in a multi-hop network 100 in accordance with some embodiments of the invention.

The process 700 starts at step 702, when the mesh authenticator (MA) 130 receives an indication that the Supplicant node 110 has performed association with the MA 130 but has not yet been authenticated. At step 704, the mesh authenticator (MA) 130 determines whether the mesh authenticator (MA) 130 knows a first EAP message to send. For example, the MA 130 may know, based on the MAC address of the supplicant node 110, the specific authentication protocol that the supplicant node 110 is configured to use, and further may know the format of the first message of the authentication protocol that must be sent to the supplicant node 110. If the MA 130 does not know the format of the first message to send, it may send an EAP Encapsulation request message to the MKD in order to request that the first message of the authentication protocol be generated by the AS 150.

If the mesh authenticator (MA) node 130 does not know the first EAP message to send, then the process 700 proceeds to step 706, where the mesh authenticator (MA) node 130 constructs the EAP encapsulation information element with an EAP message type field which specifies that the message type is a request (e.g., one or 0x01), a message token field which specifies a unique nonce value chosen by MA node 130, and a supplicant address (SPA) field which specifies the MAC address of supplicant participating in the EAP authentication. At step 706, the mesh authenticator (MA) node 130 also omits the EAP message field, and computes and inserts the message integrity check (MIC) field. The message integrity check (MIC) field protects contents of this IE (e.g., the EAP message) and additional header information from modification. At step 706, the mesh authenticator (MA) node 130 also constructs the mesh action frame, inserts the EAP Encapsulation information element into the mesh action frame, and sends the mesh action frame to MKD 140. The process 700 then proceeds to step 714.

If the mesh authenticator (MA) 130 knows a first EAP message to send, then the process 700 proceeds to step 708, where the mesh authenticator (MA) 130 sends a first EAP message, within an EAPOL packet, to Supplicant node 110. At step 710, the mesh authenticator (MA) 130 waits for and receives an EAP message, within an EAPOL packet, from the Supplicant node 110.

At step 712, the mesh authenticator (MA) 130 constructs the EAP encapsulation information element with an EAP message type field which specifies that the message type is a request (e.g., 0x01), a message token field which specifies a unique nonce value chosen by MA node 130, and a supplicant address (SPA) field which specifies the MAC address of Supplicant node 110 participating in the EAP authentication. At step 712, the mesh authenticator (MA) node 130 also inserts the EAP message obtained from the Supplicant node 110, and computes and inserts the message integrity check (MIC) field which contains a message integrity check value for integrity checking to ensure that a valid EAP message is passed to the authentication server (AS) 150 from the MKD 140. The message integrity check (MIC) field protects contents of this IE (e.g., the EAP message) and additional header information from modification. At step 712, the mesh authenticator (MA) node 130 also constructs the mesh action frame, inserts the EAP Encapsulation information element into the mesh action frame, and sends the mesh action frame to MKD 140. The process 700 then proceeds to step 714.

At step 714, the mesh authenticator (MA) node 130 waits for and receives an EAP encapsulation mesh action message from MKD 140.

Once the mesh authenticator (MA) node 130 receives an EAP encapsulation mesh action message from MKD 140, then at step 716, the mesh authenticator (MA) 130 determines if the message integrity check value from the message integrity check (MIC) field is valid. As also noted above, the message token field in each frame can be used to match EAP encapsulation response messages to EAP encapsulation request messages (e.g., match pairs of request and response frames). At step 716, the mesh authenticator (MA) 130 also determines whether the MAC address of Supplicant node specified in the supplicant address (SPA) field and the message token field received in the EAP encapsulation response message match those specified in the most recent EAP encapsulation request message.

If one of the conditions at step 716 is not satisfied, then the process 700 proceeds to step 718, where the process 700 reverts to step 714 where the mesh authenticator (MA) node 130 waits for and receives another or new EAP encapsulation response message from MKD 140. By contrast, if each of the conditions at step 716 are met, then the process 700 proceeds to step 720 where the mesh authenticator (MA) 130 sends the EAP message, within an EAPOL packet, to the Supplicant node 110.

If the EAP authentication of the Supplicant node 110 was accepted by the AS 150, then the final EAP encapsulation response message has an EAP message type equal to 2 (e.g., 0x02). As such, at step 722, the mesh authenticator (MA) 130 determines if the final EAP Encapsulation response message contains EAP message type 2 to determine whether the supplicant node 110 is accepted. If the final EAP Encapsulation response message contains EAP message type 2, then at step 724, the mesh authenticator (MA) 130 performs "accept" processing, and the process 700 ends at step 726.

If EAP authentication of the Supplicant node 110 failed, the MKD 140 sends the final EAP encapsulation response message with type "reject" to the MA 130. As such, at step 728, the mesh authenticator (MA) 130 determines if the final EAP encapsulation response message has an EAP message type equal to 3 (e.g., 0x03) to determine if the supplicant node 110 is rejected. Upon reception of a final EAP encapsulation response message of type "reject," the MA 130 terminates the association with the Supplicant node 110. At step 730, the mesh authenticator (MA) 130 performs "reject" processing, and the process 700 ends at step 726.

At step 732, the process 700 proceeds to step 710 where the mesh authenticator (MA) 130 waits for and receives another EAP message, within an EAPOL packet, from the Supplicant node 110. In this situation, it has been determined that the EAP encapsulation response message is not a final EAP encapsulation response message containing EAP message type "accept" or "reject", and therefore another EAP encapsulation mesh action message from MKD 140 should be considered.

Figure 8:
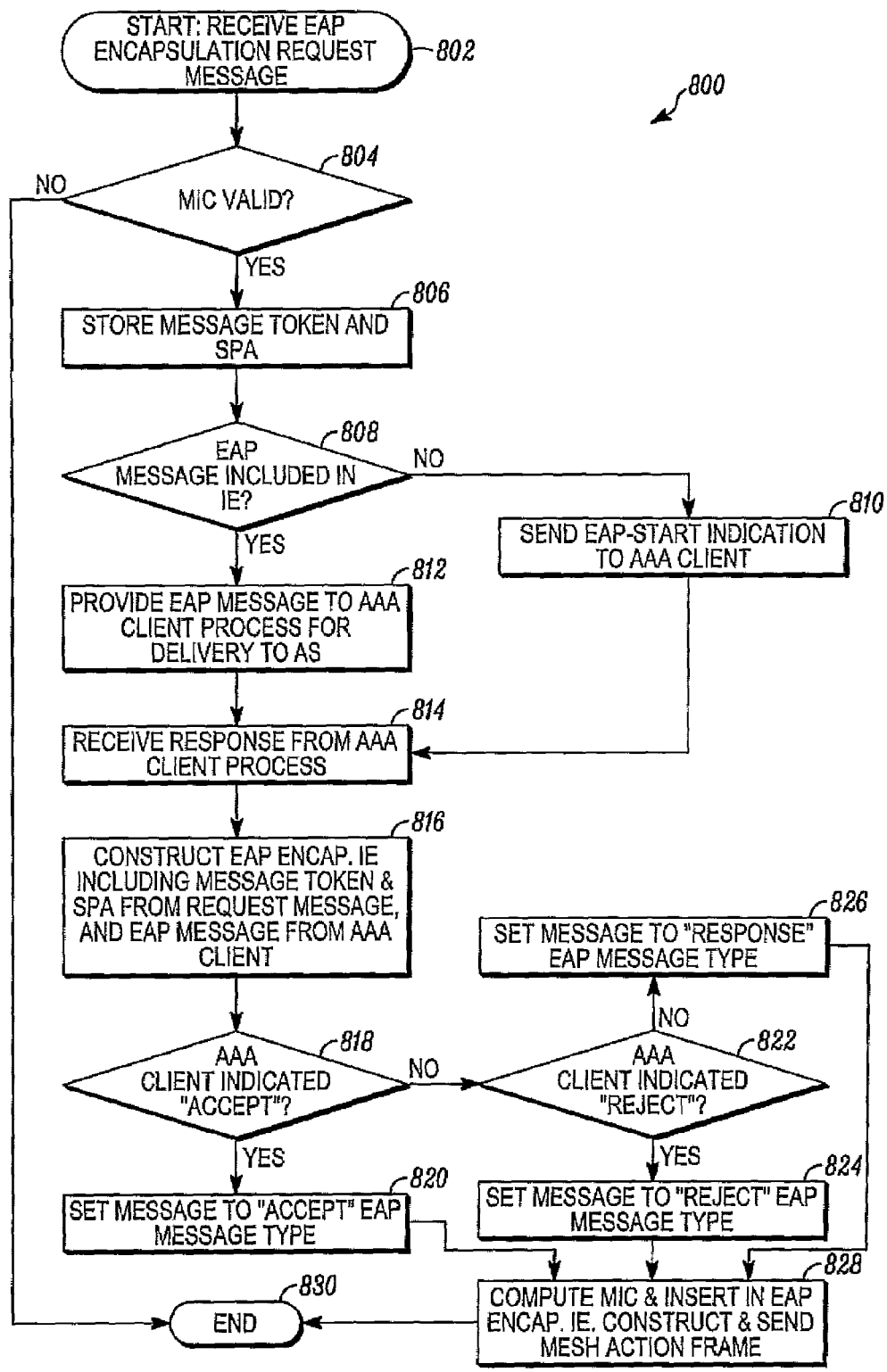
FIG. 8 is a flowchart showing an exemplary process for EAP encapsulation at a mesh key distributor (MKD) in a multi-hop network in accordance with some embodiments of the invention.

FIG. 8 is a flowchart 800 showing an exemplary process for EAP encapsulation at a mesh key distributor (MKD) 140 in a multi-hop network 100 in accordance with some embodiments of the invention.

The process 800 starts at step 802, when the mesh key distributor (MKD) 140 receives an EAP encapsulation request message such as that described with reference to FIG. 6.

At step 804, the mesh key distributor (MKD) 140 determines if the MIC value in the EAP encapsulation mesh action message is valid to ensure the integrity of the received message. If the MIC value in the EAP encapsulation mesh action message is invalid, then the process ends at step 830.

If the MIC value in the EAP encapsulation request message is valid, then at step 806, the mesh key distributor (MKD) 140 stores the message token and supplicant address (SPA) from the EAP encapsulation request message. The message token field contains a unique nonce value chosen by MA 130. The SPA field specifies the MAC address of the supplicant node 110 that is undergoing or participating in the EAP authentication.

At step 808, the mesh key distributor (MKD) 140 determines whether an EAP message is included in the EAP Encapsulation IE within the EAP encapsulation request message. If the IE does not include an EAP message, then at step 810, the mesh key distributor (MKD) 140 sends an EAP-Start indication to the AAA client. The process then proceeds to step 814.

If the EAP Encapsulation IE within the EAP encapsulation request message does include an EAP message, then at step 812, the mesh key distributor (MKD) 140 provides the EAP message to a AAA client process running on the MKD 140 for delivery to AS 150.

At step 814, the mesh key distributor (MKD) 140 receives an EAP message, generated by the AS 150, from a AAA client process running on the MKD 140.

At step 816, the MKD 140 constructs an EAP encapsulation information element including the message token and SPA from the EAP Encapsulation request message stored at step 806, and including the EAP message from the AAA client received in step 814.

As noted above, the EAP message from the AAA client will include a message type field which can have one of at least three different types which specifies the EAP message type of EAP Encapsulation response message.

At step 818, the mesh key distributor (MKD) 140 determines if the AAA client indicated "acceptance" of supplicant node's 110 request.

If the AAA client indicated accept, then at step 820, the mesh key distributor (MKD) 140 sets the EAP message type field of the EAP Encapsulation IE to indicate "acceptance" of supplicant node 110. For example, in one implementation, if the EAP message is the final message of the sequence, and the EAP authentication of the Supplicant node 110 resulted in an "accept" indication, then the EAP message type field can be set to two (e.g., 0x02), to indicate "accept" (e.g., indicating "acceptance" of supplicant node 110). The process 800 then proceeds to step 828.

If the AAA client did not indicate accept at step 818, then at step 822, the mesh key distributor (MKD) 140 determines if the AAA client indicated "rejection" of supplicant node's 110 request.

If the AAA client indicated "rejection" of supplicant node's 110 authentication, then at step 824, the mesh key distributor (MKD) 140 sets the EAP message type field of the EAP Encapsulation IE to indicate "rejection" of supplicant node 110. For example, in one implementation, if the EAP message is the final message of the sequence, and the EAP authentication of the Supplicant node 110 resulted in a "reject" indication, then the EAP message type field can be to three (e.g., 0x03), to indicate "reject" (e.g., indicating "rejection" of supplicant node 110).

If the AAA client did not indicate "rejection" of supplicant node's 110 request, then at step 826, the mesh key distributor (MKD) 140 sets the EAP message type field of the EAP Encapsulation IE to a "response" message type. For example, in one implementation, if the EAP encapsulation response message is not a final EAP encapsulation response message indicating "accept" or "reject", then the EAP message type field of the EAP Encapsulation IE can be set to 11 (e.g., 0x0B), to indicate a "response" message type. The process 800 then proceeds to step 828.

At step 828, the mesh key distributor (MKD) 140 computes a MIC, inserts it in EAP encapsulation IE, constructs a mesh action frame containing the EAP Encapsulation IE, and sends the mesh action frame to the MA 130. The message integrity check value in the message integrity check (MIC) field is calculated using a pairwise key, by the algorithm selected by the MIC algorithm subfield of the MIC control field, on the concatenation in the following order, of: MA MAC address, MKD MAC address, and contents of the EAP Encapsulation IE, with the MIC field set to 0. At step 830, the process 800 ends.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for establishing security associations within a wireless Mesh communication network, the method comprising:

authenticating one or more Mesh Authenticators with an Authentication Server using the Mesh Key Distributor as an Authentication, Authorization and Accounting (AAA) client for the Authentication Server, including creating a master key for each Mesh Authenticator and delivering the master key to the Mesh Key Distributor;

maintaining a secure communication channel using one or more layer 2 protocols between the Mesh Key Distributor and one or more Mesh Authenticators including deriving from the master key for each of the one or more Mesh Authenticators:

at least one derived Mesh Authenticator key for communicating between the Mesh Key Distributor and the Mesh Authenticator, and at least one derived Mesh Authenticator key for key delivery from the Mesh Key Distributor to the Mesh Authenticator for establishing new Supplicant security associations; and establishing a security association of a Supplicant node including:

communicating an Extensible Authentication Protocol (EAP) request message from the Supplicant node to one of the Mesh Authenticators, communicating the EAP request message from the Supplicant node to the Authentication Server by passing the EAP request message within an EAP encapsulation request message from the Mesh Authenticator to the Mesh Key Distributor over the secure communication channel using the derived key for communicating, and from the Mesh Key Distributor to the Authentication server, communicating an EAP response message from the Authentication Server to the Mesh Key Distributor, communicating the EAP response message and a message type between the Mesh Key Distributor and the Mesh Authenticator to communicate encapsulated EAP response messages, using the secure communication channel between the Mesh Key Distributor and the Mesh Authenticator, wherein the message type indicating whether the supplicant node is accepted or should not be granted access to the mesh, communicating the EAP response message from the Mesh Authenticator to the Supplicant node, and establishing the security association of the Supplicant node using a distributed unwrapped key when the message type is an accept message type.

2. A method according to claim 1, further comprising:

authenticating the Supplicant node at the Authentication Server prior to communicating the EAP response message from the Authentication Server to the Mesh Key Distributor.

3. A method according to claim 2, wherein the message type comprises:

an accept message type when the authentication of the Supplicant node is successful and the Authentication Server provided an accept indication to the Mesh Key Distributor to indicate that the Supplicant node is accepted.

4. A method according to claim 3, wherein the accept message type provides an indication to the Mesh Authenticator that the Supplicant node should be granted access.

5. A method according to claim 2, wherein the message type comprises:

a reject message type when the authentication of the Supplicant node is a failure, and the Authentication Server provided a reject indication to the Mesh Key Distributor to indicate that the Supplicant node is rejected.

6. A method according to claim 5, wherein the reject message type provides an indication to the Mesh Authenticator that the Supplicant node should not be granted access.

7. A method according to claim 5, further comprising:

terminating an association with the Supplicant node at the Mesh Authenticator when the Mesh Authenticator receives the EAP encapsulation response message comprising the reject message type.

8. A method according to claim 1, wherein the EAP encapsulation request message comprises:

a category field;

an action value field; and an EAP encapsulation information element.

9. A method according to claim 8, wherein the EAP encapsulation information element comprises:

a message integrity check (MIC) field which contains a message integrity check value for integrity checking and ensures that a valid EAP message is passed to the Authentication Server from the Mesh Key Distributor;

a EAP message type field which specifies that the message type is a request;

a message token field which specifies a unique nonce value chosen by the Mesh Authenticator; and an EAP message field which contains the EAP request message.

10. A method according to claim 9, wherein the EAP encapsulation information element further comprises:

a Message Integrity Check (MIC) control field which comprises a MIC algorithm field used to select an algorithm for calculating the MIC, a reserved field and an information element (IE) count field which specifies that one IE is protected by the MIC and included in the MIC calculation; and an address field which specifies a Medium Access Control (MAC) address of the Supplicant node.

11. A method according to claim 9, further comprising upon receiving the EAP encapsulation request message at the Mesh Key Distributor:

verifying the MIC value; and storing the unique nonce value specified in the message token field for use in constructing the EAP encapsulation response message.

12. A method according to claim 1, wherein the EAP encapsulation response message provides an indication to the Mesh Authenticator to perform appropriate action when authenticating the Supplicant node.

13. A method according to claim 1, wherein the EAP encapsulation response message comprises:
   a category field;
   an action value; and
   an EAP encapsulation information element.

14. A method according to claim 13, wherein the EAP encapsulation information element comprises:
   a message integrity check (MIC) field which contains a message integrity check value for integrity checking to ensure that a valid EAP response message is passed to the Supplicant node from the Mesh Authenticator;
   an EAP message type field which specifies the message type;
   a message token field which contains the value of the message token field in the corresponding EAP encapsulation request message to which the EAP encapsulation response message corresponds, wherein the message token field specifies a value that is identical to the unique nonce value chosen by the Mesh Authenticator; and
   an EAP message field which contains the EAP response message.

15. A method according to claim 14, wherein the EAP encapsulation information element further comprises:
   a Message Integrity Check (MIC) control field which comprises a MIC algorithm field which is used to select an algorithm for calculating the MIC, a reserved field and an information element (IE) count field which specifies that the frame includes one IE to be protected by the MIC and included in the MIC calculation; and
   an address field which specifies a Medium Access Control (MAC) address of the Supplicant node.

16. A method according to claim 14, further comprising upon receiving the EAP encapsulation response message from the Mesh Key Distributor at the Mesh Authenticator:
   verifying the message integrity check value at the Mesh Authenticator;
   using the message token field to verify that the message token received in the EAP encapsulation response message matches the message token sent in the corresponding EAP encapsulation request message.

17. A method according to claim 1, wherein the wireless communication network comprises an ad hoc multi hop communication network.

* * * * *